L. E. ROBY.
GRAIN DRILL.
APPLICATION FILED JAN. 2, 1907.
936,741.
Patented Oct. 12, 1909.
3 SHEETS—SHEET 1.
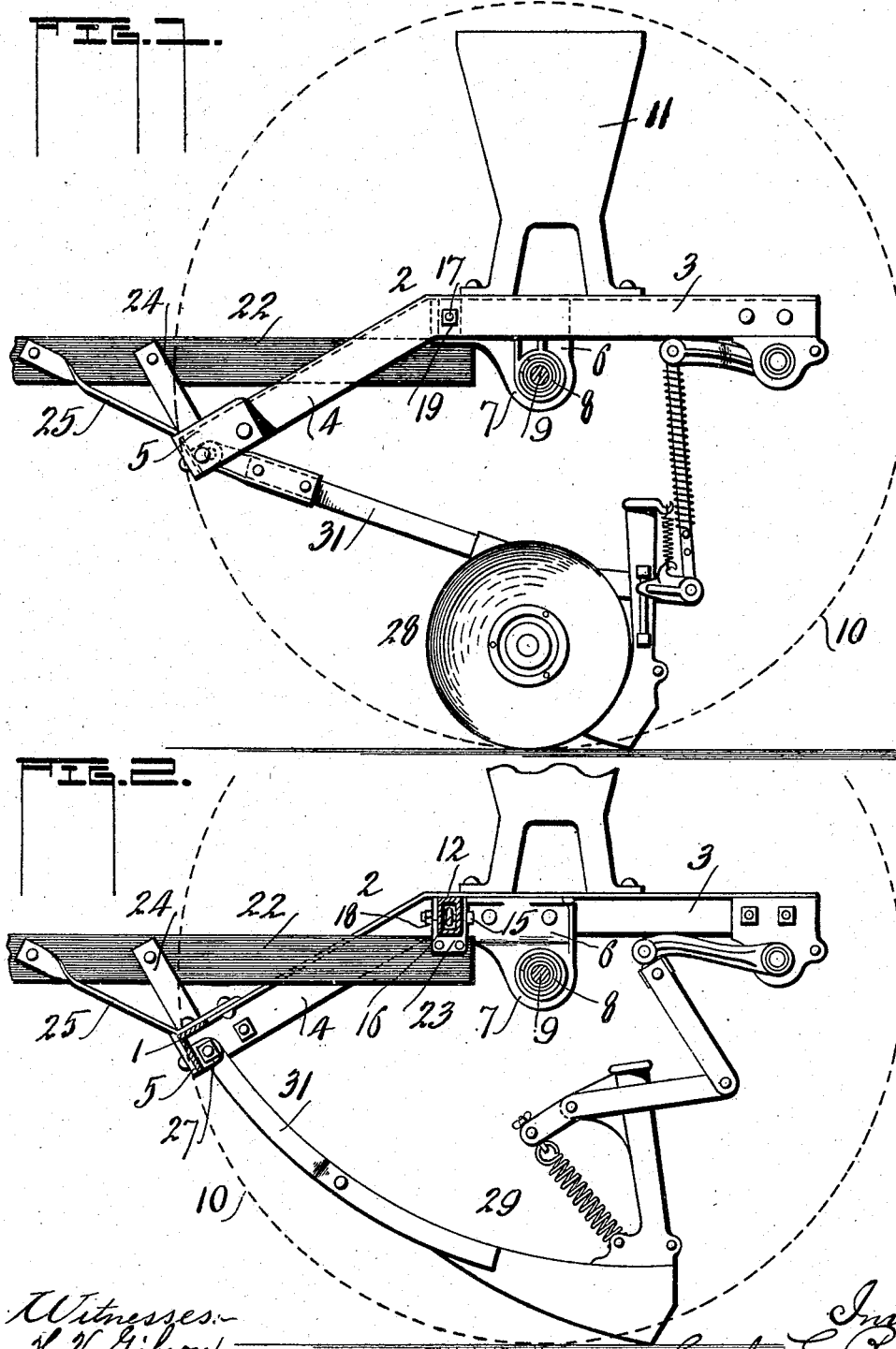

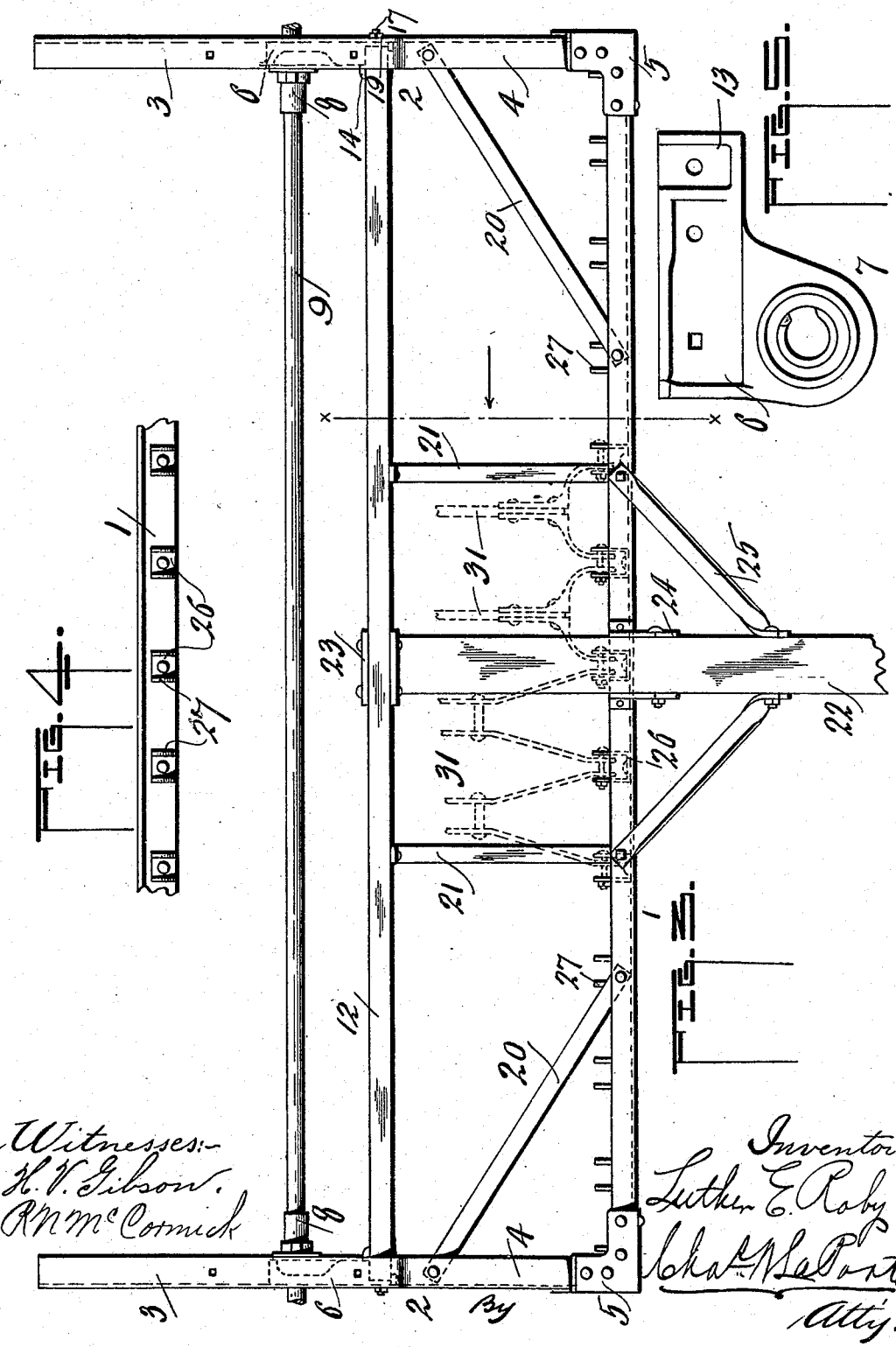

L. E. ROBY.
GRAIN DRILL.
APPLICATION FILED JAN. 2, 1907.
936,741.
Patented Oct. 12, 1909.
3 SHEETS—SHEET 3.
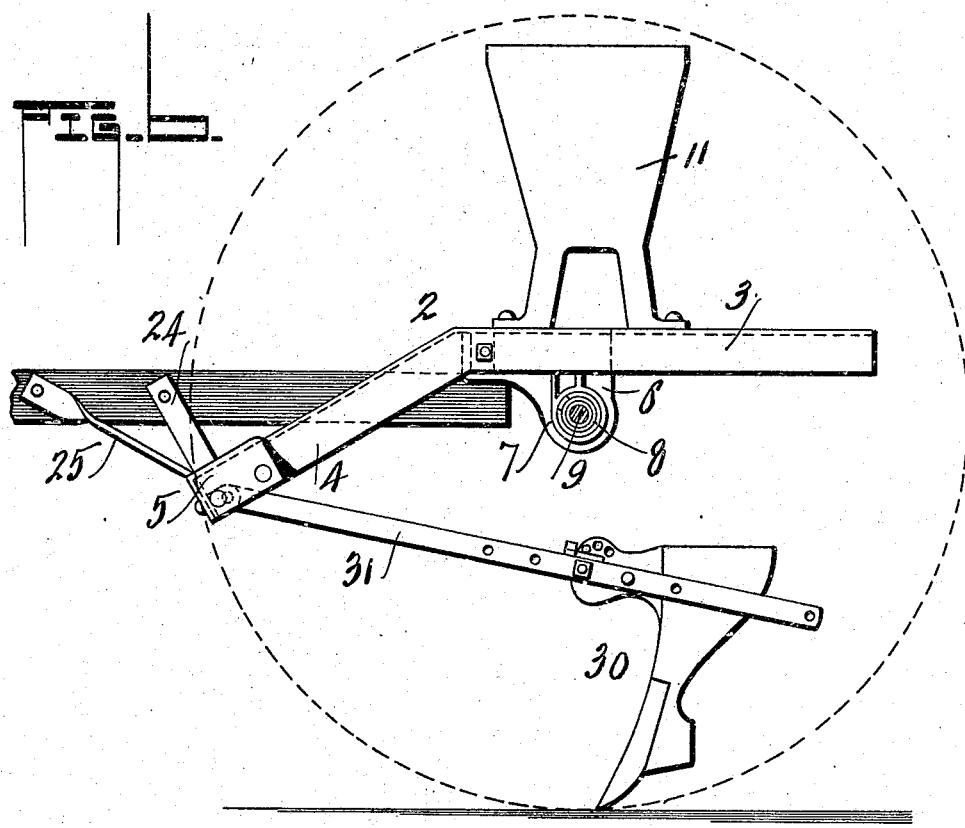
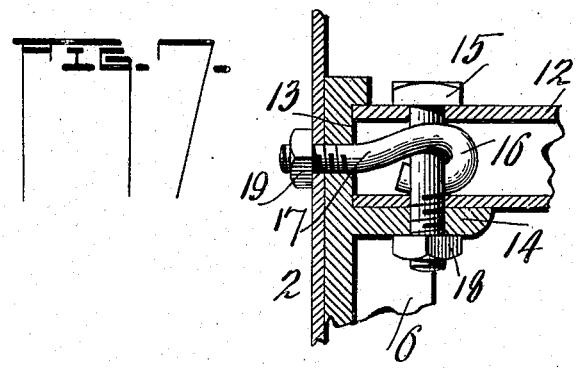

UNITED STATES PATENT OFFICE.

LUTHER E. ROBY, OF PEORIA, ILLINOIS.

GRAIN-DRILL.

936,741.

Specification of Letters Patent. Patented Oct. 12, 1909.

Application filed January 2, 1907. Serial No. 350,524.

*To all whom it may concern:*

Be it known that I, LUTHER E. ROBY, a citizen of the United States, residing at Peoria, in the county of Peoria and State of Illinois, have invented certain new and useful Improvements in Grain-Drills; and I do hereby declare that the following is a full, clear, and exact description of the invention, which will enable others skilled in the art to which it appertains to make and use the same.

This invention has reference to grain drills, and has for its object a drop-front-frame to which may be interchangeably attached the draw-bars or hangers of double and single disks, or hoe or shoe furrow openers.

A further object of the invention is a drop-front-frame for grain-drills to which may be attached a series of draw-bars or hangers of double and single disks, or hoe or shoe furrow openers; whereby one or more of said draw-bars with their attachments may be detached from said frame without the necessity of detaching or removing the remainder of said draw-bars or hangers.

The invention has for its further object a drop-front-frame for grain-drills to which may be interchangeably attached a series of draw-bars or hangers of the various forms of furrow openers; said frame containing a tubular cross-brace suitably secured at its opposite ends to the drop-frame and to a hanger for the journal-boxes of the axle.

For a further and full description of the invention herein and the merits thereof, and also to acquire a knowledge of the details of construction, of the means for effecting the result, reference is had to the following description and drawings hereto attached.

While the essential and characteristic features of the invention are susceptible of modification, still the preferred embodiment of the invention is illustrated in the accompanying drawings, in which:

Figure 1 is a side elevation of my drop-front-frame for grain-drills; also showing a grain box in elevation and a single disk with its draw-bar or hanger connected with said frame; Fig. 2 is a cross-section of the drop-front-frame, as the same would appear if taken on the line $x-x$, of Fig. 3, and showing a shoe furrow opener with its drawbar or hanger connected with said frame; Fig. 3 is a plan view of the drop-front-frame, omitting the grain-box and wheels and showing the tongue or pole connected therewith and the axle; also, showing in dotted lines the forward portions of the draw-bars or hangers connected with disks and shoe or hoe furrow openers; Fig. 4 is a detail elevation of the forward portion of the drop-front-frame showing the cleats or brackets with which the draw-bars or hangers are adapted to be connected; Fig. 5 is an enlarged detail elevation of one of the hangers for the journal boxes; Fig. 6 is an elevation of the drop-front-frame, similar to Fig. 1, except that a hoe furrow opener is shown with its drawbar or hanger connected to the frame, and Fig. 7 is an enlarged sectional detail in plan, showing the manner of rigidly connecting the opposite ends of the tubular brace to the sides of the frame.

Like numerals of reference indicate corresponding parts throughout the drawings.

The drop-front-frame referred to, is preferably made of angle-steel front and side frame parts 1 and 2. The frame parts 2 having the substantially horizontal portions 3 and downwardly inclined or sloping forward portions 4, which are connected with the opposite ends of the part 1, in the brackets 5.

To the frame parts 2 are suitably connected hangers or brackets 6, which have depending ears 7 in which are loosely carried, journal boxes 8 through which opposite ends of an axle 9 are carried supporting ground wheels 10, the latter shown in dotted lines in Figs. 1, 2 and 6; and 11 denotes the usual form of grain-box, although the details of the same have not been illustrated, nor the manner of conveying grain to the furrow openers beneath, several forms of which have been referred to and illustrated. The seeding devices form no part of this invention, nor do the furrow openers, except so far as their draw-bars or hangers coöperate with the front-drop-frame.

12 denotes a tubular-cross-piece for bracing and rigidly connecting the frame parts 2, being connected with the forward portions of the hangers 6 and the portions 3 of said frame parts 2. The hangers 6 are each provided with a seat 13 for the ends of said cross-piece 12 and with an ear 14 lying adjacent to the said cross-piece 12, as shown in Fig. 7. The manner of securing the tubular cross-piece 12, to the frame and hangers is as follows: A bolt 15 is passed transversely through the opposite ends of the cross-piece 12, also through an eye 16, of an eye-bolt 17, disposed in said cross-piece 12, and through the ear 14 of the hangers 6; the bolt being retained in such connection by means of a nut 18, engaging the threaded end of said bolt. The eye-bolt 17 has its threaded end passed through the hanger 6 also the frame-part 2, as seen in Fig. 7, and a nut 19 engaging the same rigidly secures, cross-piece, hangers and frame parts 2 together. The bolt 15 securing the cross-piece 12 to the hanger 6, and the eye-bolts 17 through their connection with the bolts 15, drawing the ends of the cross-piece 12 and frame parts 2 together.

The parts 1 and 2 of the frame are braced by means of the reaches or straps 20 carried diagonally from the portions 4 of the parts 2 to the part 1, and secured to the same in some suitable manner; and by means of braces 21 attached at one end to the tubular-cross-piece 12 and having their opposite ends connected with the portion 1 of the frame.

A pole is indicated as 22, its inner end connected to the lower side of the center of the cross-piece 12, by means of a hanger 23, and passing forward and above the portion 1 of the frame is connected and braced therefrom by means of the straps 24 and 25, see Figs. 2, 3 and 6.

Connected to the inner face of the frame part 1, and spaced at suitable intervals apart thereon, is a series of cleats 26, each having a pair of spaced and forwardly projected ears 27. To these cleats and particularly the ears thereof are pivotally connected the upper and forward ends of the draw-bars or hangers of the different forms of furrow openers; the single-disk referred to as 28, see Fig. 1; the shoe referred to as 29, see Fig. 2, and the hoe referred to as 30, see Fig. 6. The connection of the double-disk with the frame being similar to that shown in the single-disk, it has not been thought necessary to illustrate the same. The draw-bars connected with the different furrow openers, although slightly different in form, have been referred to generally as 31. Each of said draw-bars 31 are composed, preferably of a pair of diverging arms, which are pivotally connected with adjacent cleats 26, see Fig. 3. That is to say, one arm of each draw-bar is pivotally connected with a cleat, which has also connected therewith an arm of an adjacent draw-bar; one bolt being preferably employed for connecting the arms aforesaid of adjacent draw-bars with a single cleat, as best seen in Fig. 3.

Experience has demonstrated that drills of the type herein referred to, work better, if the furrow openers are hitched to their carrying frame, either with a long draw-bar where they can be hitched high, or preferably by the use of short draw-bars, to make a compact machine, which enables the furrow openers to run smoothly.

Where there is a demand for a high wheeled machine, it has been a custom to furnish a long hitch for the furrow openers with the frame, or in order to make the machine compact with the draw-bars reasonably short, drop hangers have been used depending from a straight front frame. This construction was objected to not only because of the additional weight, but because of the additional expense.

With the use of drop-hangers, the draw-bars of the furrow openers were all strung on one rod extending through the draw-bars and drop-hangers, and, if through breakage or bending, it was desired to remove one of the furrow openers, at or near the center, or in fact, at any point between the ends of the machine, it was necessary to practically tear down the machine in order to remove such furrow-openers; but with a design of frame such as I show, and the manner of connecting the draw-bars to the cleats of the frame, a furrow opener may be removed from any point on the frame without being compelled to remove any others in order to get at the one desired.

With the old style of frame, to be able to connect different styles of furrow openers thereto, it was necessary to furnish different styles of drop-hangers to suit the connection of furrow opener and as the hoe furrow opener has to have a very low hitch in front, it has never been feasible to interchange a hoe furrow opener for a disk furrow opener, on the same frame.

Manufacturers furnish drills of the types herein with the furrow openers spaced at different distances apart, usually six, seven and eight inches apart. In order to make the same furrow opener work on all the different sizes of drills, that is to say, the furrow openers with the same draw-bar connections at their forward ends, the cleats 26, referred to, are made as follows: on a machine where the furrow openers are spaced six inches apart, the cleats are preferably one inch wide; seven inches apart, two inches wide, and eight inches apart, three inches wide; it being understood that the connecting bolts are of different lengths.

Having thus fully described my invention, what I claim and desire to secure by Letters Patent of the United States, is:—

1. A frame support for grain drills, comprising the parts 1 and 2, the parts 2 having substantially horizontal portions and sloping forward portions, connections between the parts 1 and 2, hangers secured to the parts 2, a tubular brace for connecting the parts 2, bolts securing the ends of said brace to said hangers, and connections between said bolts and the parts 2.

2. A frame support for grain drills, comprising the parts 1 and 2, the parts 2 having substantially horizontal portions and sloping forward portions, connections between the parts 1 and 2, hangers secured to the parts 2, a tubular brace for connecting the parts 2, bolts securing the ends of said brace to said hangers, connections between said bolts and the parts 2, and means for connecting the draw bars of furrow openers to the part 1.

3. In combination with a pair of parallel frame parts, a hanger secured to each of said frame parts, a tubular brace, bolts securing the ends of said brace to said hangers, and eye bolts passing out of the ends of said brace, hanger and frame parts, and having the eye thereof looped about said first mentioned bolt.

4. A frame support for grain drills, comprising metallic side frames, a metallic front frame, brackets for uniting the sides and front frames, hangers attached to said side frames, an axle having bearing in said hangers, and a tubular brace having its opposite ends connected with said hangers.

5. A frame support for grain drills, comprising side and front frame members suitably united, hangers attached to and depending from said side frames, loosely carried journal boxes on said hangers, an axle journaled in and passing through said boxes, seats formed on said hangers, a brace having its opposite ends connected with the seats of the hangers, and means for uniting the ends of the brace with the hangers.

6. In a frame support for grain drills, the combination of side frame members formed with horizontal portions and inclined portions, a front frame member, brackets for securing said side and front frame members together, hangers secured to and depending from said side frame, an axle having a bearing in and passing through said hangers, a tubular brace, a rest on each hanger for the ends of the brace, means for fixedly securing the ends of the brace to the hangers, a pole secured to the brace and extending forwardly above the front frame member, and braces between front frame member and said pole.

In testimony whereof I affix my signature, in presence of two witnesses.

LUTHER E. ROBY.

Witnesses:
   CHAS. W. LA PORTE,
   J. M. ANDERSON.